(12) United States Patent
Shimizu

(10) Patent No.: US 7,965,341 B2
(45) Date of Patent: Jun. 21, 2011

(54) COLOR CORRECTION METHOD, COLOR CORRECTION DEVICE, AND COLOR CORRECTION PROGRAM

(75) Inventor: Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1198 days.

(21) Appl. No.: 11/498,015

(22) Filed: Aug. 3, 2006

(65) Prior Publication Data

US 2007/0216812 A1 Sep. 20, 2007

(30) Foreign Application Priority Data

Mar. 17, 2006 (JP) ................................ 2006-073828

(51) Int. Cl.
*H04N 9/68* (2006.01)
(52) U.S. Cl. ...................................................... 348/650
(58) Field of Classification Search .................. 348/630, 348/650, 651, 649, 55, 663, 655; 382/167, 382/162, 166
See application file for complete search history.

(56) References Cited

U.S. PATENT DOCUMENTS

| | | | |
|---|---|---|---|
| 5,446,504 A * | 8/1995 | Wada | 348/645 |
| 5,450,500 A * | 9/1995 | Brett | 382/162 |
| 5,805,213 A * | 9/1998 | Spaulding et al. | 348/222.1 |
| 5,818,613 A * | 10/1998 | Masterson et al. | 358/520 |
| 5,850,471 A * | 12/1998 | Brett | 382/162 |
| 5,867,286 A | 2/1999 | Lee et al. | |
| 5,923,316 A | 7/1999 | Kitamura et al. | |
| 6,282,312 B1 | 8/2001 | McCarthy et al. | |
| 6,326,977 B1 | 12/2001 | Westerman | |
| 6,335,734 B1 | 1/2002 | Nagae et al. | |
| 6,611,296 B1 | 8/2003 | Nieuwenhuizen et al. | |
| 6,621,497 B1 | 9/2003 | Sugiura et al. | |
| 7,408,558 B2 * | 8/2008 | Madden et al. | 345/590 |
| 7,408,573 B2 * | 8/2008 | Ishii et al. | 348/223.1 |
| 2002/0060797 A1 | 5/2002 | Namikata | |
| 2003/0052895 A1 | 3/2003 | Akiyama et al. | |
| 2004/0257599 A1 * | 12/2004 | Chi et al. | 358/1.9 |
| 2005/0036160 A1 | 2/2005 | Goto et al. | |
| 2006/0033939 A1 | 2/2006 | Han | |

FOREIGN PATENT DOCUMENTS

| | | |
|---|---|---|
| JP | 9-200790 | 7/1997 |
| JP | 11-205620 | 7/1999 |
| JP | 2000-137795 | 5/2000 |

(Continued)

OTHER PUBLICATIONS

Extended European Search Report, mailed Aug. 14, 2008 and issued in corresponding European Patent Application No. 06116633.6-1228.

(Continued)

*Primary Examiner* — Paulos M Natnael
(74) *Attorney, Agent, or Firm* — Staas & Halsey LLP

(57) ABSTRACT

A color correction method, a color correction device, and a color correction program that can achieve color correction processing with a color table with a fine spacing, while preventing the increase in memory capacity.

A signal (YCC signal) of a luminance—color difference system is subjected to matrix conversion with a matrix conversion unit 10 and converted into a signal (RGB signal) of a display signal system. The adjustment amount relating to the signal of the display signal system is stored in a RGB color adjustment LUT 20. An interpolation processing unit 20 conducts interpolation processing by referring to the RGB color adjustment LUT 20 and outputs the color-corrected RGB signal after correction.

7 Claims, 5 Drawing Sheets

FOREIGN PATENT DOCUMENTS

| | | |
|---|---|---|
| JP | 2000-152279 | 5/2000 |
| JP | 2001-103504 | 4/2001 |
| JP | 2003/506925 | 2/2003 |
| JP | 2003/092690 | 3/2003 |
| JP | 2003-125207 | 4/2003 |
| JP | 2003-163814 | 6/2003 |
| JP | 2003-219194 | 7/2003 |
| JP | 2004-135313 | 4/2004 |
| JP | 3611490 | 10/2004 |
| JP | 3664364 | 4/2005 |
| JP | 2005/269443 | 9/2005 |
| WO | 01/10116 A1 | 2/2001 |

OTHER PUBLICATIONS

Notification of Reason for Rejection for Application No. 2006-073828 mailed Apr. 27, 2010.

European Office Action for Application No. 06116633.6-1228; dated Oct. 4, 2010.

* cited by examiner

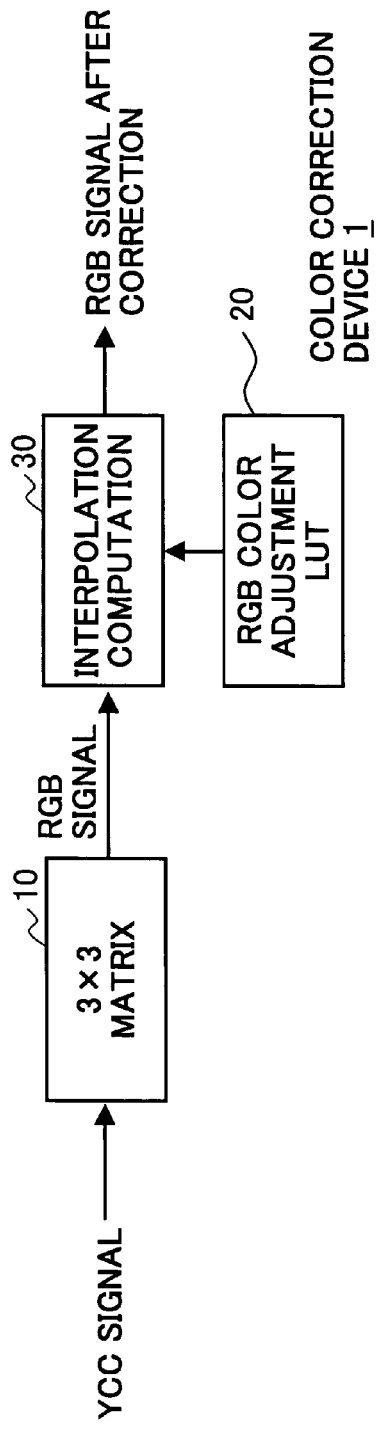
FIG. 1A CONFIGURATION EXAMPLE OF COLOR CORRECTION DEVICE
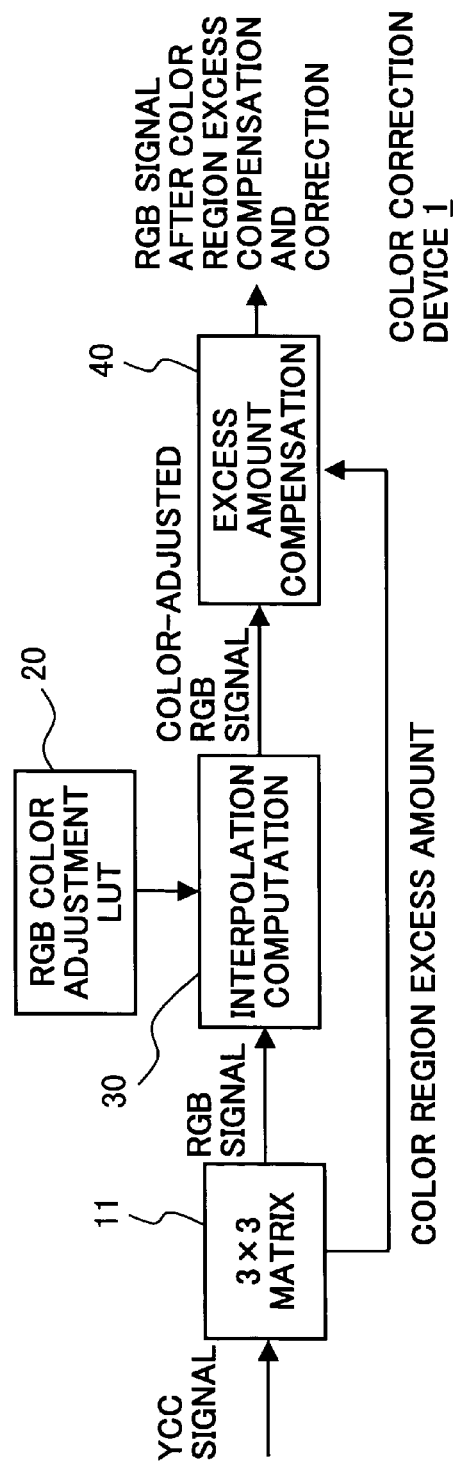
FIG. 1B CONFIGURATION EXAMPLE OF COLOR CORRECTION DEVICE

FIG. 2A

| R | G | B |
|---|---|---|
| ⋮ | ⋮ | ⋮ |
| 205 | 180 | 55 |
| 207 | 178 | 72 |
| ⋮ | ⋮ | ⋮ |

EXAMPLE OF VALUES STORED IN
RGB COLOR ADJUSTMENT LUT

FIG. 2B

| R | G | B |
|---|---|---|
| ⋮ | ⋮ | ⋮ |
| +5 | 0 | −3 |
| +3 | 0 | −1 |
| ⋮ | ⋮ | ⋮ |

EXAMPLE OF VALUES STORED IN
RGB COLOR ADJUSTMENT DIFFERENTIAL LUT

FIG. 3A CONFIGURATION EXAMPLE OF MATRIX CONVERSION UNIT
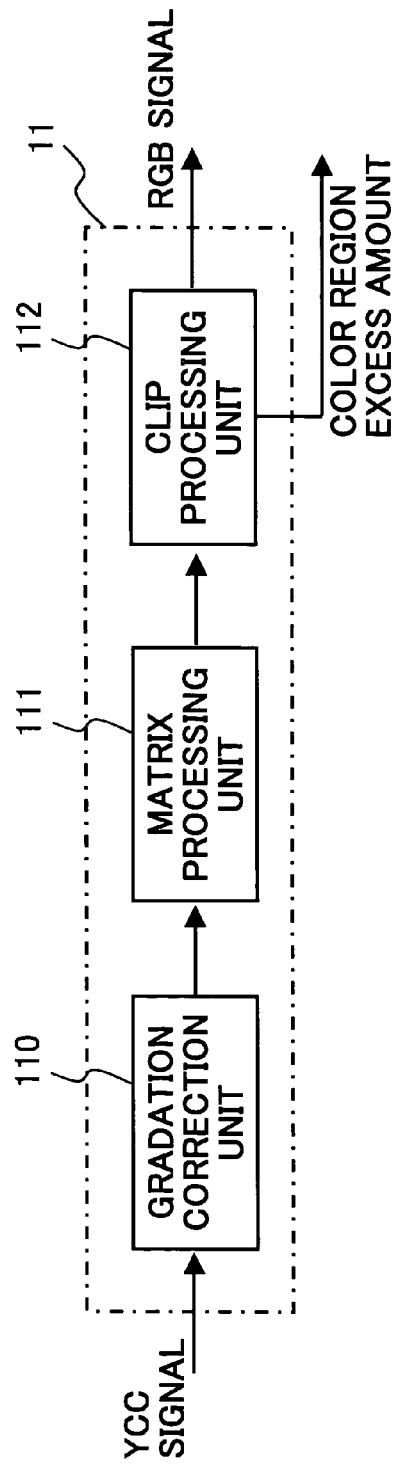
FIG. 3B CONFIGURATION EXAMPLE OF COLOR CORRECTION DEVICE
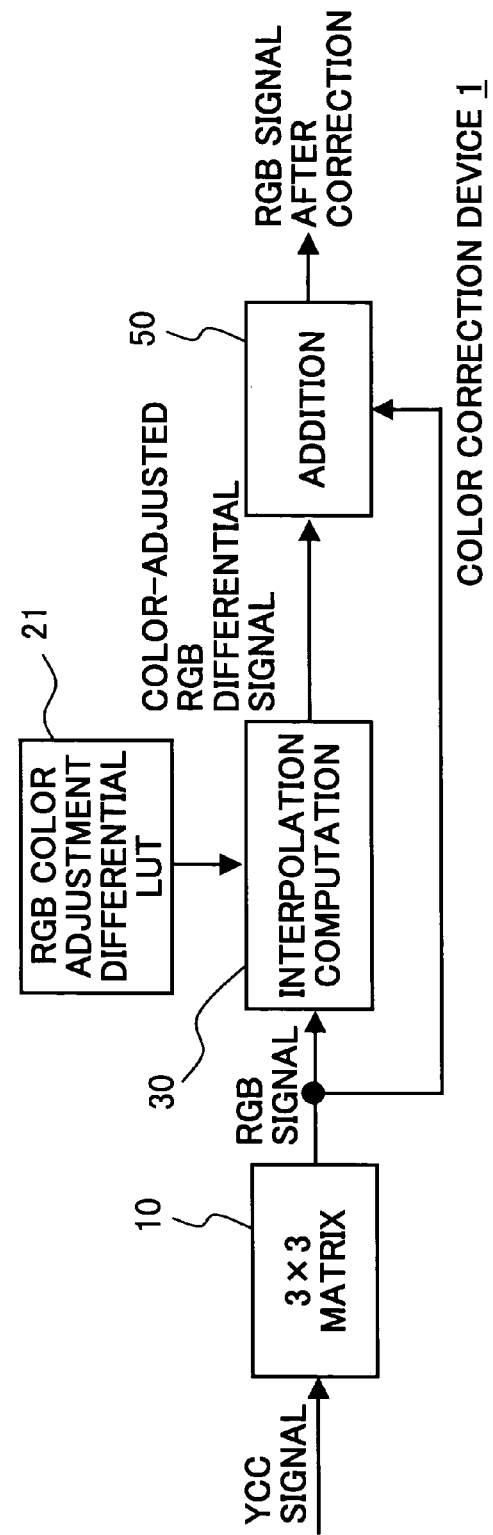

COLOR CORRECTION METHOD, COLOR CORRECTION DEVICE, AND COLOR CORRECTION PROGRAM

CROSS-REFERENCE TO RELATED APPLICATIONS

This application is based upon and claims the benefit of priority from the prior Japanese Patent Application No. 2006-073828, filed on Mar. 17, 2006, the entire contents of which are incorporated herein by reference.

BACKGROUND OF THE INVENTION

1. Field of the Invention

The present invention relates to a color correction method, a color correction device, and a color correction program for conducting color correction with respect to image signals by referring to a LUT. More particularly, the present invention relates to a color correction method and the like capable of reducing the color spacing of a LUT, while avoiding capacity increase of the memory that stores the LUT.

2. Description of the Related Art

A technology has been known by which, for example, a color of an image is beautifully displayed by conducting color correction with respect to TV video signals or image signals of digital cameras.

For example, a method for conducting color correction by using matrix computations (for example, see Japanese Patent No. 3611490, in particular FIG. 5 or Formula (1)) or a method for adjusting the lightness, saturation, and hue based on the maximum value, central value, and minimum value of the RGB signal (for example, see Japanese Patent Application Laid-Open No. 2003-163814, in particular FIG. 6) have been disclosed as the conventional technology of this type.

Furthermore, color correction is also conducted by using three-dimensional color tables. Color correction based on three-dimensional color tables was indicated to have high color reproducibility (for example, see the section relating to prior art in Japanese Patent No. 3611490), and the advantages of such color correction include good quality of displayed image and the capability of independently adjusting different colors.

Generally a three-dimensional color table stores the adjustment values of each component of an image signal (YUV, YCC, YCbCr, L*a*b, etc.) of a luminance—color difference system, but the values are stored discretely with consideration for memory capacity. The corrected image signal is then generated by conducting interpolation computations from the discrete values. The procedure described in Japanese Patent No. 3664364 is known as an interpolation computation procedure.

However, because errors occur during interpolation, the color table has to be configured with a spacing that is fine enough to maintain the image quality. On the other hand, the increase in memory capacity is also required to be prevented.

Accordingly, a technology has heretofore been disclosed (for example, Japanese Patent Application Laid-Open No. 2003-219194) by which a color space is used that was obtained by rotating the L*a*b* space through 45° about the lightness L* axis and then unequal spacing (nonlinear conversion) of coordinates thereof is created, thereby reducing the color spacing, while preventing the increase in memory capacity.

However, with the technology described in Japanese Patent Application Laid-Open No. 2003-219194, even though the rotated color space is used, there are values on the space that actually cannot be used. As a result, the memory utilization efficiency is not necessarily high. Therefore, the technology described in Japanese Patent Application Laid-open No. 2003-219194 does not necessarily prevent the increase in memory capacity.

SUMMARY OF THE INVENTION

Accordingly, the present invention was created to resolve the above-described problems and it is an object thereof to provide a color correction method, a color correction device, and a color correction program that can realize color correction processing with a fine-spacing color table, while preventing the increase in memory capacity.

In order to attain the above-described object, the present invention provides a color correction method for conducting correction processing with respect to a color signal represented in a luminance—color difference system, having the steps of converting the color signal represented in the luminance—color difference system into a color signal of a display signal system, which is a signal system of a display device, by matrix conversion and conducting color conversion with respect to the color signal of the display signal system by interpolation computation with reference to a table shown in the display signal system.

Furthermore, in accordance with the present invention, in the above-described color correction method, an adjustment amount relating to a color is stored in the table.

Furthermore, in accordance with the present invention, the above-described color correction method further has the steps of compressing a color region excess amount with respect to the color signal after the matrix conversion in the converting step and conducting compensation of the color region excess amount with respect to the color signal after the color conversion in the conducting color conversion step, wherein, in the conducting color conversion step, the interpolation computation is conducted with respect to the color signal that is compressed in the conducting compensation step.

Furthermore, in the above-described color correction method in accordance with the present invention, in the compressing step, the compression is conducted by deducting the color region excess amount from the color signal after matrix conversion, and in the conducting compensation step, the compensation is conducted by adding the color region excess amount to the color signal after color conversion.

Furthermore, in the above-described color correction method in accordance with the present invention, in the converting step, a dynamic range conversion is conducted with respect to the color signal of the luminance—color difference system by the matrix conversion.

Furthermore, in the above-described color correction method in accordance with the present invention, differential values before and after correction are stored in the table, and the method further has a step of adding up the differential value that is interpolated in the conducting color conversion step and the color signal of the display signal system before the interpolation computation correction.

Furthermore, the above-described color correction method in accordance with the present invention further has a step of correcting a luminance of the color signal or a gradation value of color difference by gradation correction with respect to the color signal represented in the luminance—color difference system, wherein in the converting step, the matrix conversion is conducted with respect to the color signal corrected in the correcting step.

Furthermore, in order to attain the aforementioned object the present invention provides a color correction device for conducting correction processing with respect to a color signal represented in a luminance—color difference system, having a conversion unit which converts the color signal represented in the luminance—color difference system into a color signal of a display signal system, which is a signal system of a display device, by matrix conversion, and an interpolation computation unit which conducts color conversion with respect to the color signal of the display signal system by interpolation computation with reference to a table shown in the display signal system.

Moreover, in order to attain the aforementioned object the present invention provides a color correction program for conducting correction processing with respect to a color signal represented in a luminance—color difference system, the program causing a computer to execute a conversion processing which converts the color signal represented in the luminance—color difference system into a color signal of a display signal system, which is a signal system of a display device, by matrix conversion, and an interpolation computation processing which conducts color conversion with respect to the color signal of the display signal system by interpolation computation with reference to a table shown in the display signal system.

The present invention provides a color correction method, a color correction device, and a color correction program that can realize color correction processing with a color table with a fine spacing, while preventing the increase in memory capacity.

BRIEF DESCRIPTION OF THE DRAWINGS

FIGS. 1A and 1B illustrate a configuration example of a color correction device;

FIG. 2A illustrates an example of values stored in a LUT for color adjustment; FIG. 2B illustrates an example of values stored in a LUT for color adjustment differentiation;

FIG. 3A shows a configuration example of a matrix conversion unit; FIG. 3B shows a configuration example of a color correction device;

DESCRIPTION OF THE PREFERRED EMBODIMENTS

Figure 4:
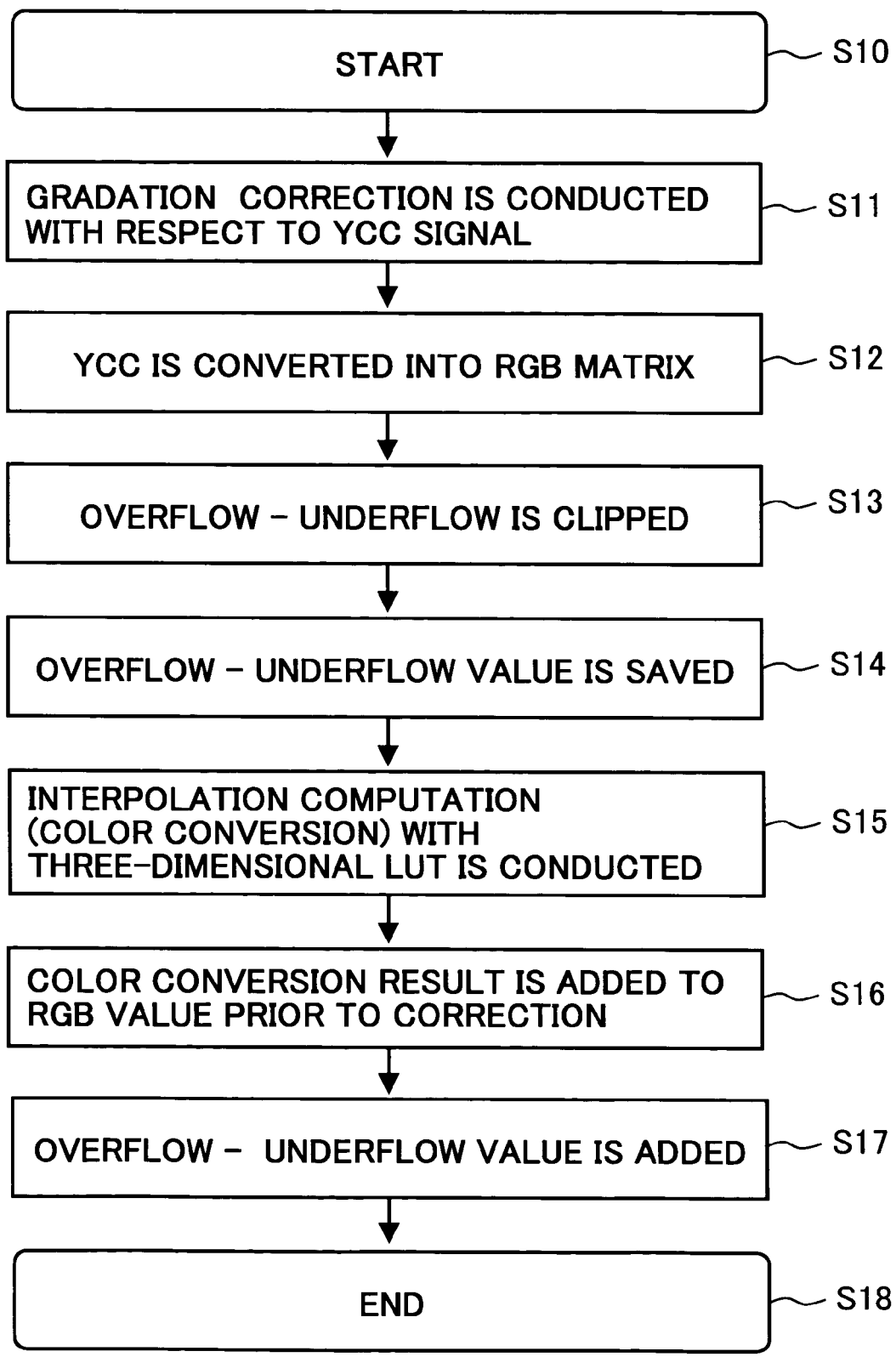
FIG. 4 is an example of a flowchart illustrating the processing operation.

The best mode for carrying out the present invention will be described below with reference to the appended drawings.

FIG. 1A shows a configuration example of a color correction device 1. The color correction device 1 has a matrix conversion unit 10, a RGB color adjustment LUT (Look Up Table) 20, and an interpolation computation unit 30.

The matrix conversion unit 10 converts the inputted image signal of a luminance—color difference system into an image signal of a display signal system, which is a signal system of a display unit. In the present embodiment, the image signal of the luminance—color difference system is taken as a YCC (luminance signal (Y) and two color difference signals (C)), and the image signal of the display signal system is taken as a RGB (Red, Green, Blue) signal. Each is considered to be a 8-bit 256-gradation signal.

In fact, by computation in use of the determinant of 3 rows and 3 columns (3×3), conversion to the RGB signal is performed in the matrix conversion unit 10.

Gradation values after the adjustment relating to the RGB signal are stored in the RGB color adjustment LUT 20. An example of the gradation values stored in the LUT 20 is shown in FIG. 2A. As shown in the figure, the values stored in the RGB color adjustment LUT 20 are values of RGB (three-dimensional) after color adjustment. For example, each value is stored so as to be available in response to a request, for example, when the displayed image has to be adjusted to a healthy skin color. The adjustment value that is wished to be adjusted may be registered for each RGB in advance. The RGB color adjustment LUT 20 stores discrete values with consideration for memory capacity.

The interpolation computation unit 30 conducts interpolation computation from each adjusted value that was read out from the RGB color adjustment LUT 20. The RGB signal after interpolation computation is output to display unit as a RGB signal after correction.

FIG. 1B shows another configuration example of the color correction device 1. In comparison with the color correction device 1 shown in FIG. 1A, the color correction device 1 has different configuration of the matrix conversion unit 11 and additionally has an excess amount compensation unit 40. The RGB color adjustment LUT 20 and interpolation computation unit 30 are identical to those of the color correction device 1 shown in FIG. 1A.

FIG. 3A shows a configuration example of the matrix conversion unit 11. The matrix conversion unit 11 has a gradation correction unit 110, a matrix processing unit 111, and a clip processing unit 112.

The gradation correction unit 110 conducts correction computation with respect to the YCC signal. With such correction computation, a bright color can be reproduced and lightness can be somewhat improved. Specific processing conducted in the gradation correction unit 110 will be described below.

The matrix processing unit 111 has a configuration identical to that of the matrix conversion unit 10 shown in FIG. 1A and conducts identical processing. The YCC signal after the correction is inputted and converted into the RGB signal of the display system by conducting matrix computation.

The clip processing unit 112 conducts clip processing with respect to the converted RGB signal. The clip processing is a process in which, when overflow or underflow has occurred with respect to each gradation value of the RGB signal, the overflow value or the underflow value is deducted to inhibit overflow, etc., by conducting correction computation in the gradation correction unit 110 (or computation by matrix conversion in the matrix processing unit 111). The value corresponding to the overflow, etc., is outputted as a color region excess amount from the clip processing unit 112 to the excess amount compensation unit 40.

Returning to FIG. 1B, the excess amount compensation unit 40 inputs the color-adjusted RGB signal after interpolation computation and the color region excess amount and conducts the processing of adding the color region excess amount to the color-adjusted RGB signal. The excess amount compensation unit 40 outputs the RGB signal after the addition to the display unit as a RGB signal subjected to color region excess compensation and correction.

In the color correction device 1 shown in FIG. 1B, the color region excess fraction is compressed by the matrix conversion unit 11 (clip processing unit 112) and compensation of this color region excess fraction is conducted with the excess amount compensation unit 40.

FIG. 3B shows a configuration example of the other color correction device 1. In comparison with the color correction device 1 shown in FIG. 1A, this device has a RGB color adjustment differential LUT 21 as a LUT for color adjustment with respect to the RGB signal and additionally has an addition unit 50.

FIG. 2B shows an example of values stored in the RGB color adjustment differential LUT 21. In the RGB color adjustment LUT 20, the processing results relating to each color of RGB were stored (see FIG. 2A), whereas in the RGB color adjustment differential LUT 21, the differential values are stored.

In the compensation computation unit 30, the compensation computation is conducted with respect to the differential values and a color-adjusted differential RGB signal is outputted. The addition unit 50 adds up the color-adjusted differential RGB signal and the RGB signal before interpolation computation. The addition unit 50 outputs the corrected RGB signal obtained by addition.

FIG. 4 shows an example of a flowchart illustrating the processing operation executed in the above-described color correction device 1.

If the process is started (S10), the gradation correction is conducted with respect to the YCC signal (S11). This is the processing executed in the gradation correction unit 110 (see FIG. 3A). This processing is not executed in the color correction device 1 shown in FIG. 1A.

Taking the inputted YCC signal as an example, when a YUV signal (YoUoVo) signal is present, the gradation correction unit 110 conducts computations by using the following numerical formulas:

$$U_1 = 1.1 * Uo \quad \text{Formula (1)}$$

$$V_1 = 1.1 * Vo \quad \text{Formula (2)}$$

Intensity adjustment of saturation can be conducted and a bright color can be reproduced according to formulas (1), (2). Furthermore, lightness can be somewhat increased by conducting computation of $$Y_1 = 255 * (Yo/255)^{0.9} \quad \text{Formula (3)}$$

with respect to the luminance signal Yo.

Then, the YCC signal (YUV signal) is converted into the RGB signal of the display system (S12). This is the processing conducted in the matrix conversion units 10, 11. More specifically, the following formulas are computed:

$$R_1 = 1.000 Y_1 + 1.402 V_1 \quad \text{Formula (4)}$$

$$G_1 = 1.000 Y_1 - 0.344 U_1 - 0.714 V_1 \quad \text{Formula (5)}$$

$$B_1 = 1.000 Y_1 + 1.772 U_1 \quad \text{Formula (6)}$$

When a dynamic range is changed (extended) with respect to the YCC signal (YUV signal) of the luminance—color difference system, then the following formulas are computed:

$$R_1 = 1.164(Y_1 - 16) + 1.596 V_1 \quad \text{Formula (7)}$$

$$G_1 = 1.164(Y_1 - 16) - 0.391 U_1 - 0.813 V_1 \quad \text{Formula (8)}$$

$$B_1 = 1.164(Y_1 - 16) + 2.018 U_1 \quad \text{Formula (9)}$$

The matrix conversion of the present embodiment includes not only the above-described Formula (4) to Formula (6), but also the above-described Formula (7) to Formula (9) for conducting subtraction processing (($Y_1 - 16$) processing) with respect to $Y_1$.

The overflow fraction and underflow fraction are then clipped (S13) and the values thereof are saved (S14). This is the processing executed in the clip processing unit 112. More specifically, the following processing is executed:

if $R_1 > 255$, then $R_2 = 255$, $R_c = R_1 - 255$ else if $R_1 < 0$ then $R_2 = 0$, $R_c = R_1$ else $R_2 = R_1$, $R_c = 0$ if $G_1 > 255$, then $G_2 = 255$, $G_c = G_1 - 255$ else if $G_1 < 0$ then $G_2 = 0$, $G_c = G_1$ else $G_2 = G_1$, $G_c = 0$ if $B_1 > 255$, then $B_2 = 255$, $B_c = B_1 - 255$ else if $B_1 < 0$ then $B_2 = 0$, $B_c = B_1$ else $B_2 = B_1$, $B_c = 0$ Te clip values ($R_c$, $G_c$, $B_c$) obtained by such processing are outputted as color region excess amounts.

Then, the interpolation computation (color conversion) is conducted with the three-dimensional LUT 20, 21 (S15). The interpolation computation unit 30 reads the gradation value (or differential value) corresponding to each gradation value of the RGB signal from the RGB color adjustment LUT 20 (or RGB color adjustment differential LUT 21) and conducts the interpolation computation. The interpolation computation may involve processing such as the well-known "three-dimensional interpolation", "prism interpolation", or "pyramid interpolation". Alternatively, the interpolation computation disclosed in the aforementioned Japanese Patent No. 3664363 may be also used. The RGB signal after interpolation computation is taken as ($R_3$, $G_3$, $B_3$).

The color conversion results are then added to the RGB signal before the correction (S16). This processing is executed in the addition unit 50 (see FIG. 3B). This processing is conducted because the differential value after interpolation has to be added to the RGB signal prior to correction since the differential values are stored in the RGB color adjustment differential LUT 21 (see FIG. 2B).

More specifically, the following computations are executed.

$$R_4 = R_2 + R_3 \quad \text{Formula (10)}$$

$$G_4 = G_2 + G_3 \quad \text{Formula (11)}$$

$$B_4 = B_2 + B_3 \quad \text{Formula (12)}$$

The clip compensation, that is, the addition of the overflow value or underflow value is then conducted (S17). This is the processing executed in the excess amount compensation unit 40 (see FIG. 1B). More specifically, the following computations are executed.

$$R_5 = R_4 + R_c \quad \text{Formula (13)}$$

$$G_5 = G_4 + G_c \quad \text{Formula (14)}$$

$$B_5 = B_4 + B_c \quad \text{Formula (15)}$$

By the above-described procedure, the color-corrected RGB signals ($R_3$, $G_3$, $B_3$) or ($R_4$, $G_4$, $B_4$) after correction, or RGB signals ($R_5$, $G_5$, $B_5$) after the correction that were subjected to color region excess compensation are obtained from YUV signals (Yo, Uo, Vo).

In the present embodiment, as described hereinabove, the RGB signals (adjustment amounts) of the display system are stored in the LUT 20, 21 for color correction (for color adjustment).

Figure 5:
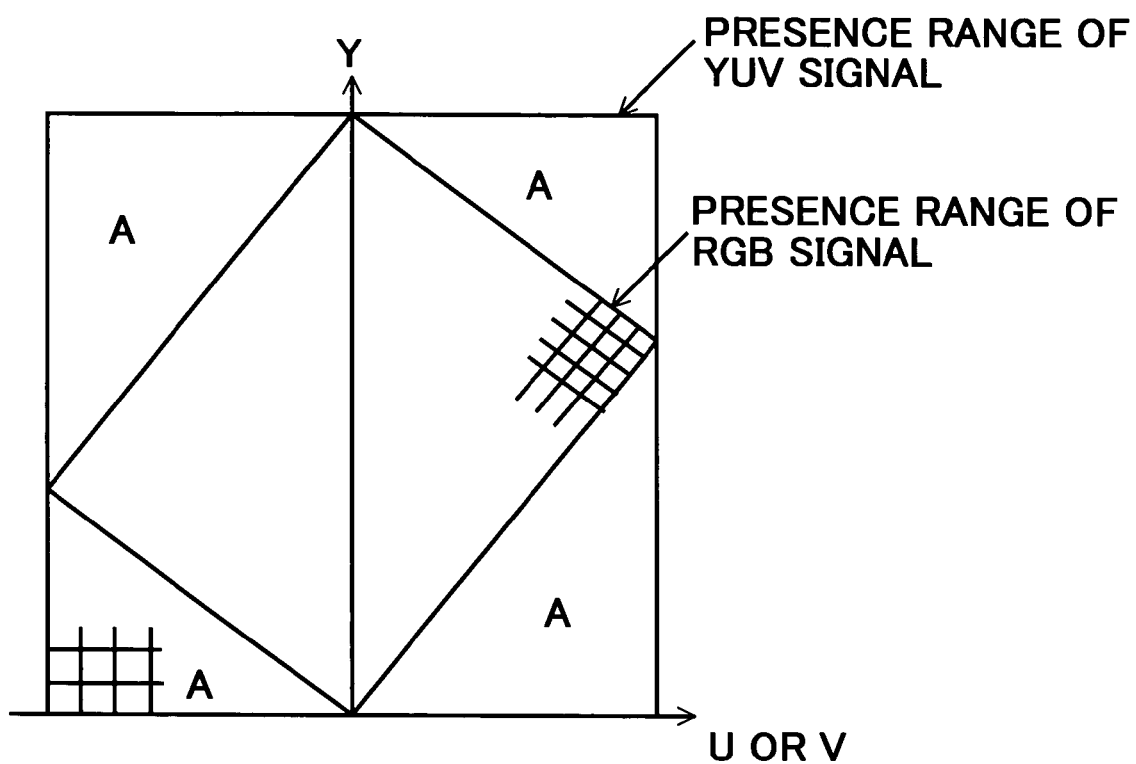
FIG. 5 illustrates an example of a presence range of a YUV signal and a RGB signal.

FIG. 5 shows an example of ranges where the YUV signals of the luminance—color difference system and RGB signals of the display system are present. As shown in the figure, the range where the RGB signals are present is narrower than the range where the YUV signals are present. Even if the LUT for color correction is composed of signals of the luminance— color difference system, there are values (region A) which are actually not used for the display. Therefore, in the LUT composed of the luminance—color difference system, the utilization efficiency thereof is hardly sufficient. However, as was explained in the above-described example, in the present embodiment, the LUT 20, 21 for color correction are composed of RGB signals of the display system. Therefore, the utilization efficiency of the LUT 20, 21 based on the present embodiment is about "100%".

Furthermore, because the values of the region (region A) that is not used for display are not stored in the LUT 20, 21, the adjustment values present in the location of the unnecessary grating points are not stored and the memory capacity can therefore be reduced.

Furthermore, the discrete adjustment amounts are stored in the LUT 20,21. At this time, the color spacing can be refined even if the identical number of adjustment amounts are stored in the LUT based on the YUV signals of the luminance—color difference system and LUT 20, 21 of the present embodiment.

As shown in FIG. 5, if the locations of the values stored in the LUT are shown by grating points, then even if the LUTs comprising the same number of grating points are composed of the YUV signals and RGB signals, the spacing of all the grating points in the range of the RGB signal will be narrower than that within the range of the YUV signal. As a result, the color spacing can be refined and color reproduction in the display system can be finely adjusted.

Furthermore, as explained with reference to FIG. 1B, because the clip compensation has been conducted, the gradation changes of the inputted YCC signal can be reliably displayed and the texture of the displayed image can be compensated. Therefore, a highly accurate displayed image can be obtained with respect to the inputted image.

Furthermore, as explained with reference to FIG. 2B, because the adjusted amounts of differential values are stored in the LUT 21 for color correction, the table size can be reduced by comparison with the case where the processing results are themselves stored. Because the adjustment causing sudden changes, such as from a skin color to a blue color, are rarely conducted in the case of color adjustment, the range of values that can be assumed by the differential values themselves is small. Therefore, the increase in memory capacity can be prevented.

In the above-described example, the explanation was conducted with respect to the case where the YCC signal or YUV signal was used as a signal of the luminance—color difference system. It goes without saying that the present embodiment can be implemented and the same operation and effect can be demonstrated with other signals of the luminance—color difference system, such as Lab signal.

Furthermore, an example was explained in which the RGB signal was the signal of the display system, but the present embodiment can be implemented and the same operation and effect can be demonstrated with any signal, provided it is a signal of the display system that can be displayed in a display unit.

Furthermore, in the above-described example, the YCC signal and RGB signal were explained as 256-gradation signals. It goes without saying that the implementation is possible and the operation and effect identical to that of the above-described example will be demonstrated with signals with gradation of 9 or more bit and 7 or less bit.

The present color correction device 1 can be also employed in information devices such as personal computers, TV, VTR (Video Tape Recorder), DVD (Digital Video Disk) devices and portable information terminals such as cellular phones or PDA (Personal Digital Assistance) devices.

What is claimed is:

1. A color correction method for conducting correction processing with respect to a color signal represented in a luminance—color difference system, comprising:
   converting said color signal represented in said luminance—color difference system into a color signal of a display signal system, which is a signal system of a display device, by matrix conversion;
   compressing a color region excess amount with respect to said color signal of the display signal system;
   conducting color conversion with respect to said color signal of the display signal system after said compressing, by interpolation computation with reference to a table shown in said display signal system; and
   conducting compensation of said color region excess amount with respect to said color signal of the display signal system after said color conversion.

2. The color correction method according to claim 1, wherein an adjustment amount relating to a color is stored in said table.

3. The color correction method according to claim 1, wherein said compressing is conducted by deducting said color region excess amount from said color signal of the display signal system, and said compensation is conducted by adding said color region excess amount to said color signal of the display signal system after said color conversion.

4. The color correction method according to claim 1, wherein in said converting, a dynamic range conversion is conducted with respect to said color signal of the luminance—color difference system by said matrix conversion.

5. The color correction method according to claim 1, further comprising correcting said luminance of said color signal represented in said luminance—color difference system or a gradation value of color difference by gradation correction with respect to said color signal represented in said luminance—color difference system,
   wherein said matrix conversion is conducted with respect to said color signal represented in said luminance—color difference system after said correcting.

6. A color correction device for conducting correction processing with respect to a color signal represented in a luminance—color difference system, comprising:
   a conversion unit which converts said color signal represented in the luminance—color difference system into a color signal of a display signal system, which is a signal system of a display device, by a matrix conversion;
   a compression unit which compresses a color region excess amount with respect to said color signal of the display signal system;
   an interpolation computation unit which conducts color conversion with respect to said color signal of the display signal system after said compressing by said compression unit, by interpolation computation with reference to a table shown in said display signal system; and
   a compensation of color region excess amount unit which conducts compensation said color region excess amount with respect to said color signal of the display signal system after said color conversion by said interpolation computation unit.

7. A color correction method for conducting correction processing with respect to a color signal represented in a luminance—color difference system, comprising:
   converting said color signal represented in said luminance—color difference system into a color signal of a display signal system, which is a signal system of a display device, by matrix conversion;
conducting color conversion with respect to said color signal of the display signal system, by interpolation computation with reference to a table, stored differential values before and after correction, shown in said display signal system; and
adding one of said differential values that is interpolated to a gradation value of said color signal of the display signal system before said interpolation computation correction.

* * * * *